United States Patent
Laroche et al.

(10) Patent No.: US 10,286,356 B2
(45) Date of Patent: May 14, 2019

(54) PROCESS FOR THE REMOVAL OF ACID GASES FROM GASEOUS MIXTURES USING AN AQUEOUS SOLUTION OF 2-DIMETHYLAMINO-2-HYDROXYMETHYL-1, 3-PROPANEDIOL

(71) Applicant: Dow Global Technologies LLC, Midland, MI (US)

(72) Inventors: Christophe R. Laroche, Lake Jackson, TX (US); John R. Dowdle, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/502,701

(22) PCT Filed: Oct. 6, 2015

(86) PCT No.: PCT/US2015/054216
§ 371 (c)(1),
(2) Date: Feb. 8, 2017

(87) PCT Pub. No.: WO2016/057495
PCT Pub. Date: Apr. 14, 2016

(65) Prior Publication Data
US 2017/0225117 A1    Aug. 10, 2017

Related U.S. Application Data

(60) Provisional application No. 62/062,336, filed on Oct. 10, 2014.

(51) Int. Cl.
*B01D 53/14* (2006.01)
*C07C 215/10* (2006.01)
(Continued)

(52) U.S. Cl.
CPC ..... *B01D 53/1493* (2013.01); *B01D 53/1456* (2013.01); *B01D 53/1468* (2013.01);
(Continued)

(58) Field of Classification Search
None
See application file for complete search history.

(56) References Cited

U.S. PATENT DOCUMENTS 4,336,233 A    6/1982    Appl et al.
4,997,630 A    3/1991    Wagner et al.
(Continued)

FOREIGN PATENT DOCUMENTS

EP    0134948    3/1985
WO    2013188367    12/2013

OTHER PUBLICATIONS

"Material Safety Data Sheet for 2-dimethylamino-2-hydroxymethyl-propane-1,3-diol." Activate Scientific, published Jul. 31, 2014.*

*Primary Examiner* — Daniel Berns

(57) ABSTRACT

The present invention relates to an aqueous alkanolamine solution demonstrating low volatility comprising 2-di-methylamino-2-hydroxymethyl-1,3-propanediol useful for removing acid gases from gaseous mixtures. Said aqueous alkanolamine solution may further comprise one or more of an acid or acid-forming compound, another amino compound, an activator, a physical solvent, or one or more other compounds used in gal-liquid treatment practices. Further, the present invention relates to a process for removing acid gases from a gaseous mixture, preferably hydrogen sulfide, comprising the step of contacting the gaseous mixture with said aqueous alkanolamine solution. Examples of the gaseous mixtures include natural gas, synthesis gas, tail gas, and refinery gas.

13 Claims, 2 Drawing Sheets

(51) Int. Cl.
*C07C 211/08* (2006.01)
*C10K 1/00* (2006.01)
*C10K 1/14* (2006.01)
*C10L 3/10* (2006.01)

(52) U.S. Cl.
CPC .............. *C10K 1/003* (2013.01); *C10K 1/004* (2013.01); *C10K 1/143* (2013.01); *C10L 3/102* (2013.01); *B01D 2252/204* (2013.01); *B01D 2252/20431* (2013.01); *B01D 2252/20489* (2013.01); *B01D 2252/504* (2013.01); *B01D 2252/602* (2013.01); *B01D 2256/245* (2013.01); *B01D 2257/304* (2013.01); *B01D 2257/308* (2013.01); *B01D 2257/504* (2013.01); *C10L 2290/542* (2013.01); *Y02P 20/152* (2015.11)

(56) References Cited

U.S. PATENT DOCUMENTS

| | | | | |
|---|---|---|---|---|
| 5,700,438 A | * | 12/1997 | Miller | B01D 53/48 |
| | | | | 423/225 |
| 5,877,386 A | | 3/1999 | Schubert | |
| 6,337,059 B1 | | 1/2002 | Schubert et al. | |
| 2013/0172622 A1 | * | 7/2013 | Moore | C07C 213/00 |
| | | | | 564/448 |
| 2016/0271558 A1 | * | 9/2016 | Laroche | B01D 53/1468 |

* cited by examiner

PROCESS FOR THE REMOVAL OF ACID GASES FROM GASEOUS MIXTURES USING AN AQUEOUS SOLUTION OF 2-DIMETHYLAMINO-2-HYDROXYMETHYL-1, 3-PROPANEDIOL

FIELD OF THE INVENTION

The present invention relates to a composition comprising an aqueous solution of an alkanolamine, specifically 2-dimethylamino-2-hydroxymethyl-1,3-propanediol, and a process for using said aqueous composition for removing acid gases, such as $CO_2$, COS, and preferably $H_2S$, from gaseous mixtures comprising acid gases.

BACKGROUND OF THE INVENTION

Fluid streams, both liquid and gaseous, derived from natural gas reservoirs, petroleum or coal, often contain a significant amount of acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. Said fluid streams include natural gas, refinery gas, hydrocarbon gases from shale pyrolysis, synthesis gas, liquefied natural gas, and the like.

Liquid amine absorbents, including alkanolamines, dissolved in water are probably the most common absorbents for removing acid gases. Commercially, amine scrubbing typically involves contacting the acid gas containing fluid stream with an aqueous solution of one or more simple amines (e.g., monoethanolamine (MEA), diethanolamine (DEA), methyldiethanolamine (MDEA), triethanolamine (TEA) and its isomers, or 2-(2-aminoethoxy)ethanol (sometimes referred to as diglycolamine or DGA)) as disclosed in U.S. Pat. Nos. 4,336,233; 4,997,630; 5,877,386; and 6,337,059 and WO 2013188367. Alternatively, EP 0134948 discloses mixing an acid with select alkaline materials such as MDEA, to provide enhanced acid gas removal.

Acid gas removal from liquid natural gas streams typically takes place in liquid-liquid contacting equipment whereas acid gas removal for gaseous streams takes place in gas-liquid contacting equipment typically cyclic absorption technologies such as Pressure Swing Absorption (PSA) and Temperature Swing Absorption (TSA) using liquid absorbents. Liquid-liquid separations present unique problems not encountered with gas-liquid separations and visa versa. Loss of amine due to solubility is a particular problem in liquid-liquid separation processes, but not relevant in gas-liquid separation processes. On the other hand, loss of amine due to volatility can be a particular problem in gas-liquid separation processes while irrelevant in liquid-liquid separations. As a practical matter, amines with low solubility useful for liquid-liquid separations may not necessarily have low volatility desired for gas-liquid separations.

Typically, in gas-liquid processes, the aqueous amine solution contacts the gaseous mixture comprising the acidic gases counter currently at low temperature and high pressure in an absorber tower. Cyclic sorption processes require high rates of gas-liquid exchange, the transfer of large liquid inventories between the absorption and regeneration steps, and high energy requirements for the regeneration of amine solutions. Such processes require a large temperature differential in the gas stream between the absorption and desorption (regeneration) parts of the cycle. In conventional aqueous amine scrubbing methods relatively low temperatures, e.g., less than 50° C., are required for acid gas uptake with an increase to a temperature to above about 100° C., e.g., 120° C. or higher, required for the desorption. With the need to regenerate large quantities of solution at temperatures above 100° C., many amines commonly used in gas-liquid separation process suffer significant amine loss due to vaporization in the temperature swing processes.

While the above mentioned amine compounds are effective at removing acid gases from gas and/or liquid mixtures, they each have limitations which detract from their universal use. In particular, it would be desirable to have and aqueous amine composition with reduced loss due to volatility which is efficient at removing acid gases, in particular $H_2S$, at a commercially viable capacity from a gaseous mixture.

SUMMARY OF THE INVENTION

The present invention is such an aqueous alkanolamine solution composition and a process for using said composition for the removal of acid gases from a gas mixture comprising acid gases, preferably a gaseous mixture comprising hydrogen sulfide, wherein the alkanolamine demonstrates reduced loss due to volatility. Said composition comprises 2-dimethylamino-2-hydroxymethyl-1, 3-propanediol (DMTA), preferably in an amount of from 0.1 to 75 weight percent based on the total weight of the aqueous alkanolamine solution. Wherein the process using said aqueous alkanolamine solution composition is useful for removing acid gases, preferably selectively removing hydrogen sulfide, through contact with a gaseous mixture comprising said acid gases, preferably comprising hydrogen sulfide, wherein forming a lean acid gas gaseous mixture and a loaded acid gas alkanolamine solution.

In one embodiment of the present invention the aqueous alkanolamine solution may optionally comprises an acid or an acid-forming material, such as an organic or inorganic acid having a pKa of 8 or less, preferably 7 or less, more preferably 6 or less, preferably phosphoric acid, sulfuric acid, boric acid, formic acid, or hydrochloric acid, when present the acid or an acid-forming material is present in an amount of from 0.1 to 25 weight percent based on the total weight of the aqueous alkanolamine solution.

In one embodiment of the present invention the aqueous alkanolamine solution does not comprise any additional amino compound(s).

In another embodiment of the present invention the aqueous alkanolamine solution further optionally comprises one or more additional amino compound, when present, preferably in an amount of from 0.1 to 75 weight percent, preferred additional amino compounds may comprise monoethanolamine (MEA); tris(2-hydroxyethyl)amine (TEA); tris(2-hydroxypropyl)amine (triisopropanol); tributanolamine; bis(2-hydroxyethyl)methylamine (MDEA); 2-diethylaminoethanol (DEEA); 2-dimethylaminoethanol (DMEA); 3-dimethylamino-1-propanol; 3-diethylamino-1-propanol; 2-diisopropylaminoethanol (DIEA); N,N-bis(2-hydroxypropyl)methylamine (MDIPA); N,N'-bis(2-hydroxyethyl)piperazine (DiHEP)); diethanolamine (DEA); 2-(tert-butylamino)ethanol; 2-(tert-butylaminoethoxy)ethanol; 2-amino-2-methylpropanol (AMP); 2-(2-amino-ethoxy) ethanol; or a 1-hydroxyethyl-4-pyridnlypiperazine compound, further preferred amino compounds may comprise one or more tertiary amino group.

In another embodiment of the present invention, the aqueous solution of 2-dimethylamino-2-hydroxymethyl-1, 3-propanediol further comprises an activator compound to accelerate total acid gas absorption. Preferably, the activator may be piperazine, hydroxyethylpiperazine, diethanolamine, N-methylaminoethanol, 2-methylpiperazine, N-methylpiperazine, 2-methyl-2-aminopropanol, monoethanolamine, 2-hydroxymethyl-2-methylaminopropane-1,3-diol, and 2-amino-2-hydroxymethylpropane-1,3-diol. When present, the activator compound is preferably present in an amount of from 1 to 20 weight percent.

In another embodiment of the present invention the aqueous solution of 2-dimethylamino-2-hydroxymethyl-1, 3-propanediol may further optionally comprise a physical solvent, preferably selected from cyclotetramethylenesulfone, dimethyl ethers of polyethylene glycol, 1,3-dimethyl-3,4,5,6-tetrahydro-2(1H)-pyrimidinone, N-formylmorpholine, N-acetylmorpholine, triethylene glycol monomethyl ether, glycerol, monoethylene glycol, diethylene glycol, triethylene glycol, tetraethylene glycol, methanol, ethanol, or mixtures thereof and is preferably present in an amount of from 1 to 75 weight percent.

In one embodiment of the process of the present invention the temperature of the aqueous alkanolamine solution is equal to or greater than 40° F.

In another embodiment of the present invention, the process further comprises the step of partially removing acid gases from the aqueous alkanolamine solution to form an acid gas lean aqueous alkanolamine solution which may be recycled and used in said contacting step, preferably the partial removal of the acid gases is achieved by steam stripping.

DETAILED DESCRIPTION OF THE INVENTION

Figure 1:
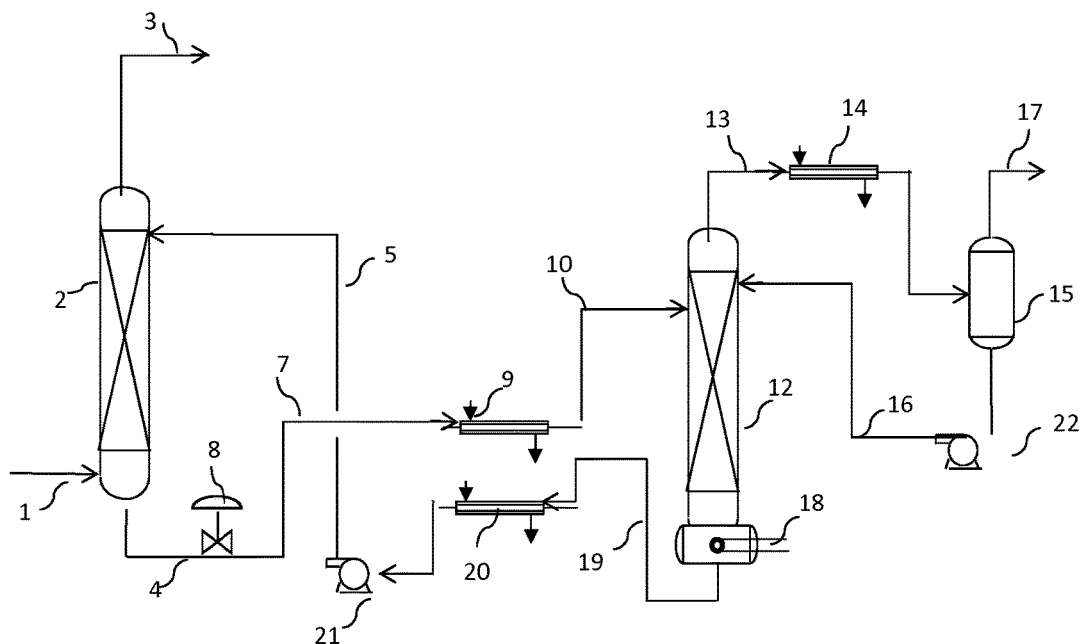
FIG. 1 illustrates a process flow diagram of an acid gas removal process according the present invention.

In one embodiment, the present invention is an aqueous alkanolamine solution composition comprising 2-dimethylamino-2-hydroxymethyl-1,3-propanediol (sometimes referred to as dimethyltrisamine, DMTA) useful for the removal of acid gases from gas mixtures wherein the alkanolamine demonstrates reduced loss due to volatility.

In another embodiment, the present invention is a process for removing acid gases, preferably selectively removing hydrogen sulfide, from a gas mixture comprising said acid gases through contact with an aqueous alkanolamine solution comprising 2-dimethylamino-2-hydroxymethyl-1,3-propanediol.

The aqueous alkanolamine solution for the removal of acid gases from gas mixtures of the present invention comprises 2-dimethylamino-2-hydroxymethyl-1,3-propanediol and optionally an acid or an acid-forming material in an amount of from 0 to 25 weight percent based on the total weight of the aqueous alkanolamine solution.

The aqueous alkanolamine solution of the present invention contains 2-dimethylamino-2-hydroxymethyl-1,3-propanediol in an amount equal to or greater than 0.1 weight percent, preferably equal to or greater than 5 weight percent, more preferably equal to or greater than 10 weight percent and even more preferably equal to or greater than 20 weight percent wherein weight percent is based on the total weight of the aqueous solution. The aqueous alkanolamine solution of the present invention contains 2-dimethylamino-2-hydroxymethyl-1, 3-propanediol in an amount equal to or less than 75 weight percent, preferably equal to or less than 65 weight percent, more preferably equal to or less than 55 weight percent and even more preferably equal to or less than 50 weight percent wherein weight percent is based on the total weight of the aqueous solution.

Suitable acids or acid-forming materials that can be used in the present invention can be characterized as strong acids which include any organic or inorganic acid having a pKa of 8 or less, preferably 7 or less, more preferably 6 or less. Acids that can be used include phosphoric acid which is preferred because of its low corrosive effects, phosphorus acid, boric acid, hydrochloric acid, sulfuric acid, boric acid, sulfurous acid, nitrous acid, pyrophosphoric acid, and telurous acid. Also included as suitable acids are organic acids such as acetic acid, formic acid, adipic acid, benzoic acid, n-butyric acid, chloroacetic acid, citric acid, glutaric acid, lactic acid, malonic acid, oxalic acid, o-phthalic acid, succinic acid, and o-toluic acid. In addition, acid-forming materials that are capable of forming acids upon contact with water can be used. The acids formed from such acid-forming materials useful in the present invention have a pKa of 8 or less, preferably 7 or less, and more preferably 6 or less. A suitable acid-forming material is sulfur dioxide.

If present in the aqueous alkanolamine solution of the present invention, the acid and/or acid-forming material is present in an amount equal to or greater than 0.1 weight percent, preferably equal to or greater than 0.5 weight percent, more preferably equal to or greater than 1 weight percent wherein weight percent is based on the total weight of the aqueous solution. If present in the alkanolamine solution of the present invention, the acid and/or acid-forming material is present in an amount equal to or less than 25 weight percent, preferably equal to or less than 10 weight percent, more preferably equal to or less than 5 weight percent and even more preferably equal to or less than 2.5 weight percent wherein weight percent is based on the total weight of the aqueous solution.

The aqueous alkanolamine composition of the present invention may optionally contain one or more additional amino compound in an amount of from 0 to 75 weight percent based on the total weight of the aqueous alkanolamine solution. Preferably, the additional amino compound is monoethanolamine (MEA); tris(2-hydroxyethyl)amine (triethanolamine, TEA); tris(2-hydroxypropyl) amine (triisopropanol); tributanolamine; bis(2-hydroxyethyl)methylamine (methyldiethanolamine, MDEA); 2-diethylaminoethanol (diethylethanolamine, DEEA); 2-dimethylaminoethanol (dimethylethanolamine, DMEA); 3-dimethylamino-1-propanol; 3-diethylamino-1-propanol; 2-diisopropylaminoethanol (DIEA); N,N-bis(2-hydroxypropyl) methylamine (methyldiisopropanolamine, MDIPA); N,N'-bis(2-hydroxyethyl)piperazine (dihydroxyethylpiperazine, DiHEP)); diethanolamine (DEA); 2-(tert-butylamino)ethanol; 2-(tert-butylaminoethoxy)ethanol; 2-amino-2-methylpropanol (AMP); 2-(2-amino-ethoxy)ethanol; or a 1-hydroxyethyl-4-pyridnlypiperazine compound.

Preferred additional amino compounds comprise one or more tertiary amino group.

Preferably the additional amino compound has one or more sterically hindered amino group.

An aqueous alkanolamine solution comprising 2-dimethylamino-2-hydroxymethyl-1,3-propanediol, a 1-hydroxyethyl-4-pyridnlypiperazine compound, and an amine having one or more sterically hindered amino group is particularly suitable for the removal of $H_2S$.

If present, the amount of the one or more optional amino compound in the aqueous alkanolamine solution may independently range from equal to or greater than 0.1 weight percent, preferably equal to or greater than 1 weight percent, more preferably equal to or greater than 5 weight percent based the total weight of the aqueous alkanolamine solution. If present, the amount of the one or more optional amino compound in aqueous alkanolamine solution may independently range from equal to or less than 75 weight percent, preferably equal to or less than 50 weight percent, more preferably equal to or less than 25 weight percent based the total weight of the aqueous alkanolamine solution.

In one embodiment of the present invention the aqueous alkanolamine solution does not comprise any additional amino compound(s).

The aqueous alkanolamine composition of the present invention may optionally contain an activator compound to accelerate total acid gas absorption in an amount of from 0 to 20 weight percent based on the total weight of the aqueous alkanolamine solution. Preferably, the activator compound is piperazine, hydroxyethylpiperazine, diethanolamine, N-methylaminoethanol, 2-methylpiperazine, N-methylpiperazine, 2-methyl-2-aminopropanol, monoethanolamine, 2-hydroxymethyl-2-methylaminopropane-1,3-diol, and 2-amino-2-hydroxymethylpropane-1,3-diol. When present, the activator compound should preferably be in an amount from 1 to 20 weight percent. If present, the activator compound is present in an amount of from equal to or greater than 1 weight percent, preferably equal to or greater than 2 weight percent, and more preferably equal to or greater than 3 weight percent of the total aqueous alkanolamine solution. If present, the activator compound is present in an amount of from equal to or less than 20 weight percent, preferably less than 15 weight percent, and more preferably less than 12 weight percent of the aqueous alkanolamine solution.

In one embodiment of the present invention the only additional amino compound the aqueous alkanolamine solution comprises is one or more activator compound listed herein above, preferably piperazine or a piperazine compound.

In a preferred embodiment, for the selective removal of hydrogen sulfide from a gas mixture containing hydrogen sulfide, there is no additional amino compound in the aqueous alkanolamine solution of the present composition and process. In other words, 2-dimethylamino-2-hydroxymethyl-1,3-propanediol is the only amino compound in the aqueous alkanolamine solution of the present invention.

For removing acid gases, preferably $H_2S$ from a gaseous mixture, the temperature of the aqueous alkanolamine solution which is brought into contact with the gas to be treated is equal to or greater than 40° F., preferably equal to or greater than 60° F., more preferably equal to or greater than 70° F., and even more preferably equal to or greater than 80° F.

In addition to the acid or acid-forming compound, an additional amino compound, an activator, the aqueous alkanolamine solution may comprise one or more other compounds used in gas-liquid treatment following well known practices. Illustrative compounds which may optionally be provided include, but are not limited to, one or more of the following: antifoaming agents; physical solvents including glycols and the mono- and di-ethers or esters thereof, aliphatic acid amides, N-alkylated pyrrolidones, sulfones, and sulfoxides; antioxidants; corrosion inhibitors; film formers; chelating agents such as metals; pH adjusters such as alkali compounds. The amount of these optional components is not critical but may be provided in an effective amount following known practices.

In addition to the acid or acid-forming compound, an additional amino compound, an activator, the optional one or more other compounds used in fluid treatment, the aqueous alkanolamine solution may comprise a physical solvent in an amount of from 0 to 75 weight percent based on the total weight of the aqueous alkanolamine solution. Preferably a solvent such as cyclotetramethylenesulfone (available under the tradename SULFOLANE, dimethyl ethers of polyethylene glycol (available under the tradename SELEXOL from The Dow Chemical Company), and triethylene glycol monomethyl ether (TGME or METHOXYTRIGLYCOL from The Dow Chemical Company), 1,3-dimethyl-3,4,5,6-tetrahydro-2(1H)-pyrimidinone, N-formylmorpholine, N-acetylmorpholine, glycerol, ethylene glycols (for example, monoethylene glycol, diethylene glycol, triethylene glycol, tetraethylene glycol, etc.), alcohols (for example, methanol, ethanol, etc.), or mixtures thereof.

If present, the amount of physical solvent in the aqueous alkanolamine solution may be present in an amount from equal to or greater than 1 weight percent, preferably equal to or greater than 5 weight percent, more preferably equal to or greater than 10 weight percent based on the total weight of the aqueous alkanolamine solution. If present, the amount of physical solvent in the aqueous alkanolamine solution may be present in an amount equal to or less than 75 weight percent, preferably equal to or less than 65 weight percent, more preferably equal to or less than 50 weight percent based the total weight of the solution.

The invention set forth herein has great application in the petrochemical and energy industries. For example, the present invention can be used for the treatment of gas streams in an oil refinery, the treatment of sour gas, the treatment of coal steam gas, the treatment of hazardous stack emissions, the treatment of land field gases, and a new series of devices dealing with hazardous emissions for human safety.

The gaseous streams to be treated by the aqueous alkanolamine solution and process of the present invention contain an acid gas mixture which may include one or more of $H_2S$, $CO_2$, $N_2$, $CH_4$, $C_2H_6$, $C_3H_8$, $H_2$, CO, $H_2O$, COS, HCN, $NH_3$, $O_2$, and mercaptans. Often such gas mixtures are found in combustion gases, refinery gases, town gas, natural gas, syn gas, tail gas, water gas, propane, propylene, heavy hydrocarbon gases, etc. The aqueous alkanolamine solution herein is particularly effective when the gaseous mixture, is obtained, for example, from shale oil retort gas, coal or gasification of heavy oil with air/steam or oxygen/steam thermal conversion of heavy residual oil to lower molecular weight liquids and gases, or in sulfur plant tail gas clean-up operations.

The process of the present invention is preferably used to remove $H_2S$ from a gas stream comprising $H_2S$ optionally in the presence of one or more other acid gas impurities, for example $CO_2$, $N_2$, $CH_4$, $C_2H_6$, $C_3H_8$, $H_2$, CO, $H_2O$, COS, HCN, $NH_3$, $O_2$, and/or mercaptans. However, the present invention may be used to remove $H_2S$ and one or more of $CO_2$, $N_2$, $CH_4$, $C_2H_6$, $C_3H_8$, $H_2$, CO, $H_2O$, COS, HCN, $NH_3$, $O_2$, and/or mercaptans from a gas stream comprising $H_2S$ and one or more of $CO_2$, $SO_2$, $CS_2$, HCN, COS, and/or mercaptans.

The absorption step of this invention generally involves contacting the gaseous mixture with the aqueous alkanolamine solution in any suitable contacting vessel, for examples of representative absorption processes see U.S. Pat. Nos. 5,736,115 and 6,337,059, see FIG. 1. In such processes, the gaseous mixture containing acid gases, for example $H_2S$ and optionally $CO_2$ and/or other impurities from which the $H_2S$ is to be removed may be brought into intimate contact with the aqueous alkanolamine solution using conventional means, such as a tower or vessel packed with, for example, rings or with sieve plates, or a bubble reactor.

In a typical mode of practicing the invention, the absorption step is conducted by feeding the gaseous mixture into the lower portion of the absorption tower while fresh aqueous alkanolamine solution is fed into the upper region of the tower. The fluid stream, freed largely from acid gases, such as the $H_2S$, emerges from the upper portion (sometimes referred to as treated or cleaned gas) of the tower, and the loaded aqueous alkanolamine solution, which contains the absorbed $H_2S$ and other impurities, leaves the tower near or at its bottom. Preferably, the inlet temperature of the absorbent composition during the absorption step is equal to or greater than 40° F., preferably within the range of from 40° F. to 210° F., and more preferably from 70° F. to 150° F. Pressures may vary widely; acceptable pressures are between 5 and 2,000 pounds per square inch (psi), preferably 20 to 1,500 psi, and most preferably 25 to 1,000 psi in the absorber. Gaseous mixtures with low partial pressures, such as those encountered in thermal conversion processes, will require less of the aqueous alkanolamine solution under the same absorption conditions than gaseous mixtures with higher partial pressures such as shale oil retort gases.

A typical procedure for the acid gas, such as $H_2S$, removal phase of the process comprises absorbing acid gases via countercurrent contact of a gaseous mixture containing $H_2S$ and $CO_2$ with the aqueous alkanolamine solution of the amino compound in a column containing a plurality of trays at a temperature, of at least 40° F., and at a gas velocity of at least 0.3 feet per second (ft/sec, based on "active" or aerated tray surface), depending on the operating pressure of the gas, said tray column having fewer than 40 contacting trays, with, e.g., 4 to 16 trays being typically employed.

After contacting the gaseous mixture with the aqueous alkanolamine solution, which becomes saturated or partially saturated with $H_2S$ and other impurities, the solution may be at least partially regenerated so that it may be recycled back to the absorber. As with absorption, the regeneration may take place in a single liquid phase. Regeneration or desorption of the acid gases from the aqueous alkanolamine solution may be accomplished by conventional means of heating, expansion, stripping with an inert fluid, or combinations thereof, for example pressure reduction of the solution or increase of temperature to a point at which the absorbed acid gases flash off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from 120° F. to 340° F., and preferably from 170° F. to 300° F., and the pressure of the solution on regeneration should range from 0.5 psi to 100 psi, preferably 1 psi to 50 psi. The aqueous alkanolamine solution, after being cleansed of at least a portion of the absorbed acid gases, may be recycled back to the absorbing vessel. Make-up absorbent may be added as needed.

One of the advantages of the composition and process of the present invention is that because DMTA has a lower volatility, less is loss during the process, and therefore less make-up absorbent is required.

In a preferred regeneration technique, the acid gas-rich, i.e., $H_2S$-rich, aqueous alkanolamine solution is sent to the regenerator wherein the absorbed components are stripped, for example by steam which may be generated by boiling the solution. Pressure in the flash drum and stripper is usually 1 psi to 50 psi, preferably 15 psi to 30 psi, and the temperature is typically in the range from 120° F. to 340° F., preferably 170° F. to 270° F. Stripper and flash temperatures will, of course, depend on stripper pressure; thus at 15 psi to 30 psi stripper pressures, the temperature will be 170° F. to 250° F. during desorption. Heating of the solution to be regenerated may very suitably be affected by means of indirect heating with low-pressure steam. It is also possible, however, to use direct injection of steam. The resulting acid gas-lean, in particular hydrogen sulfide-lean, aqueous alkanolamine solution may be used to contact a gaseous mixture containing acid gases.

Preferably the clean gas contains equal to or less than 10 ppm $H_2S$, meeting some environmental regulations, more preferably equal to or less than 4 ppm $H_2S$, meeting typical pipeline specifications.

In one embodiment of the present invention the process is a pressure swing absorption (PSA) process. In another embodiment of the process of the present invention the process is a temperature swing absorption (TSA) process. A preferred embodiment of the present invention involves performing the process of the present invention continuously, or as a continuous process. However, the method may be performed batch wise or semi-continuously. Selection of the type of process used should be determined by the conditions, equipment used, type and amount of gaseous stream, and other factors apparent to one of ordinary skill in the art based on the disclosure herein.

Examples

Examples 1 to 15 are an aqueous amine absorbent solution comprising 50 parts by weight of one or more alkanolamine, 50 parts by weight deionized water, and optionally 1 part by weight of an acid, parts by weight are based on the total weight of the aqueous amine absorbent solution. A gas stream comprising a synthetic mixture containing 5 percent $H_2S$, 2 percent $CO_2$ and 93 percent $N_2$, wherein percent is percent by volume, is treated in a pilot scale absorber to remove the $H_2S$ and $CO_2$. For each aqueous amine absorbent solution, the gas stream is treated at three different flow rates.

Physical characteristics for the alkanolamines used in the examples are listed in Table 1.

TABLE 1

|  | MEA | DGA | MDEA | DEA | DMTA |
|---|---|---|---|---|---|
| pKa | 9.5 | 9.4 | 8.7 | 8.9 | 9.1 |
| Relative solubility in heptane | 0.06 | 0.2 | 1 | 0.001 | 0.008 |
| Boiling point, ° F. | 171 | 221 | 247 | 268 | 335 |

The compositions, process parameters, and residual $H_2S$ and $CO_2$ levels for Examples 1 to 15 are listed in Table 2. In Table 2:

"MEA" is 98% monoethanolamine available from The Dow Chemical Company;

"DGA" is 98% 2-aminoethoxyethanol available from Aldrich;

"DEA" is 98% diethanolamine available from The Dow Chemical Company;

"MDEA" is 98% methyldiethanolamine available from The Dow Chemical Company;

"DMTA" is 98% dimethyltrisamine produced following "Organic Preparations and Procedures International; 1981, 13(2), p 126-129"; and "$H_3PO_4$" is an 85% o-phosphoric acid available from Fisher Scientific.

An aqueous amine absorbent solution is introduced into the pilot scale absorber FIG. 1 via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 115 psia. The clean gas (i.e., reduced amounts of $H_2S$ and $CO_2$) is discharged at the top of the absorber 2 through line 3 and residual $H_2S$ and $CO_2$ levels are determined by gas chromatography (GC) analysis. The aqueous amine solution loaded with $H_2S$ and $CO_2$ flows toward the lower portion of the absorber, and leaves via line 4.

The aqueous amine in line 4 is reduced in pressure by the level control valve 8 and flows through line 7 to heat exchanger 9, which heats the loaded aqueous solution. The hot rich solution enters the upper portion of the regenerator 12 via line 10. The regenerator 12 is equipped with random packing which effects desorption of the $H_2S$ and $CO_2$ gases. The pressure of the regenerator is set at 27 psia. The gases are passed through line 13 into condenser 14 wherein cooling and condensation of any residual water and amine occurs.

The gases enter a separator 15 wherein the condensed liquid is separated from the vapor phase. The condensed aqueous solution is pumped via pump 22 through line 16 to the upper portion of the regenerator 12. The gases remaining from the condensation are removed through line 17 for final collection and/or disposal. The regenerated aqueous solution flows down through the regenerator 12 and the close-coupled reboiler 18. The reboiler 18, equipped with an electrical heating device, vaporizes a portion of the aqueous solution to drive off any residual gases. The vapors rise from the reboiler and are returned to the regenerator 12 which comingle with falling liquid and then exit through line 13 for entry into the condensation stage of the process. The regenerated aqueous solution from the reboiler 18 leaves through line 19 and is cooled in heat exchanger 20, and then is pumped via pump 21 back into absorber 2 through feed line 5.

The flow rate for the aqueous amine absorbent is determined by slowly adjusting downward until the amount of $H_2S$ in the purified gas line 3 shows a dramatic increase.

Figure 2:
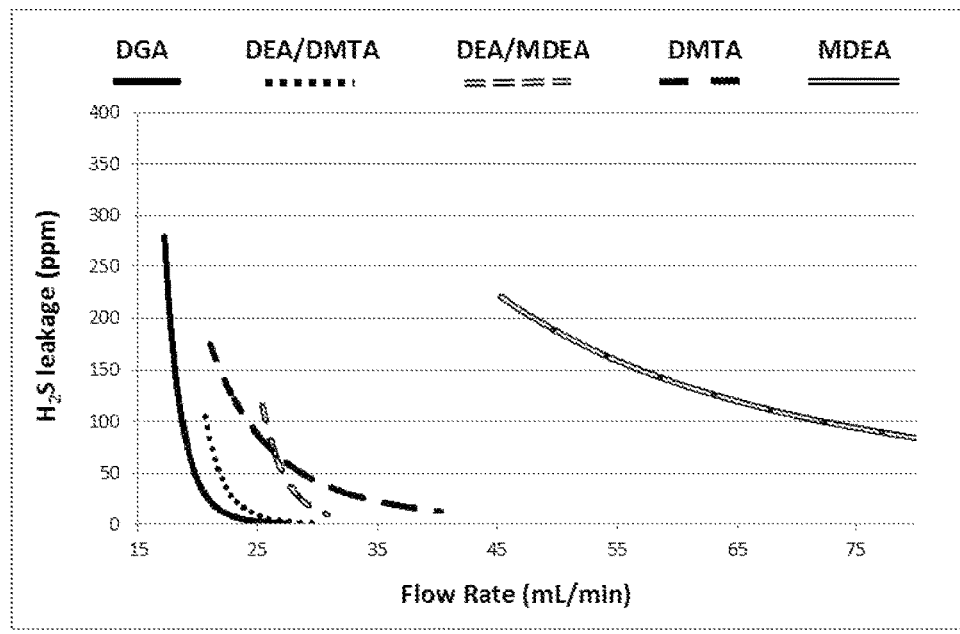
FIG. 2 is a plot of $H_2S$ concentration in a cleaned gas mixture versus the absorbent circulation rate for DMTA, DGA, MDEA, and mixtures of DEA/DMTA and DEA/MDEA.

The results for Examples 1 to 15 are graphically represented in the plot shown in FIG. 2. $H_2S$ levels, in parts per million by volume (ppmv), are plotted against the amine flow rate in cubic centimeters per minute (cc/min).

Alkanolamine Volatility.

Figure 3:
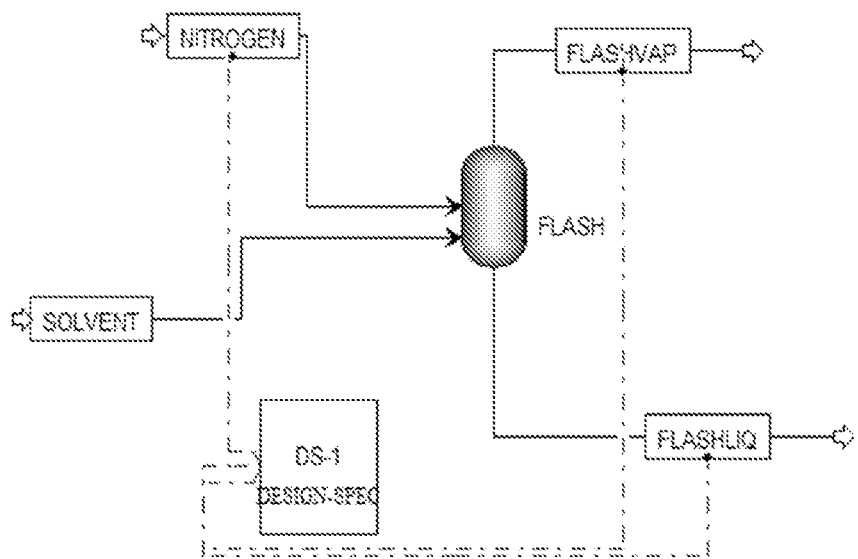
FIG. 3 illustrates a calculation scheme for determining volatility curves for alkanolamines.

Volatility curves are calculated for several representative alkanolamines according to the scheme depicted in FIG. 3. A defined solvent mixture is fed to a flash tank at a temperature of 120° F. and mixed with an amount of nitrogen sufficiently large that a vapor stream exits the flash. The molar flow of nitrogen to the flash vessel is adjusted so that the ratio of the molar flow of the vapor leaving the flash vessel to the molar flow of the liquid leaving the flash vessel is maintained at $1\times10^{-4}$. The vapor leaving the flash is saturated and the mole fraction of alkanolamine in the vapor may be used as an estimate of alkanolamine losses. For each alkanolamine, the solvent strength is specified at 40 wt %, and the pressure of the flash vessel is varied from 100 to 10000 kPa. Aspen Plus v8.0 is used for the calculations using the electrolyte NRTL model of Chen & Evans (1986), see Chen, C. C., Evans, L. B., 1986, *A local composition model for the excess Gibbs energy of aqueous electrolyte systems*, AIChE J. 32, 444-454, doi:10.1002/aic.690320311.

TABLE 2

| | Example | | | | | | | | | | | | | | |
|---|---|---|---|---|---|---|---|---|---|---|---|---|---|---|---|
| | 1* | 2* | 3* | 4* | 5* | 6* | 7 | 8 | 9 | 10* | 11* | 12* | 13 | 14 | 15 |
| Absorbent Composition | | | | | | | | | | | | | | | |
| DGA | 50 | 50 | 50 | | | | | | | | | | | | |
| DEA | | | | | | | | | | 30 | 30 | 30 | 30 | 50 | 30 |
| MDEA | | | | 50 | 50 | 50 | | | | 20 | 20 | 20 | | | |
| DMTA | | | | | | | 50 | 50 | 50 | | | | 20 | 20 | 20 |
| $H_3PO_4$ | 1 | 1 | 1 | 1 | 1 | 1 | 1 | 1 | 1 | 1 | 1 | 1 | 1 | 1 | 1 |
| Water | 50 | 50 | 50 | 50 | 50 | 50 | 50 | 50 | 50 | 50 | 50 | 50 | 50 | 50 | 50 |
| Absorbent Flow Rate, cc/min | 17.2 | 20.0 | 27.2 | 45.3 | 58.5 | 81.1 | 21.0 | 24.9 | 40.2 | 25.4 | 27.6 | 30.8 | 20.6 | 25.0 | 30.0 |
| Outlet Gas GC Analysis | | | | | | | | | | | | | | | |
| $CO_2$, ppmv | 22 | 20 | 17 | 12700 | 11000 | 7800 | 13000 | 13000 | 7500 | 60 | 1 | 1 | 1334 | 542 | 240 |
| $H_2S$, ppmv | 430 | 40 | 1 | 250 | 115 | 90 | 220 | 65 | 14 | 150 | 25 | 12 | 116 | 7 | 1 |
| Lean Solution Temperature, ° F. | 150 | 150 | 150 | 150 | 150 | 150 | 150 | 150 | 150 | 150 | 150 | 150 | 150 | 150 | 150 |
| Inlet Gas Temperature, ° F. | 120 | 120 | 120 | 120 | 120 | 120 | 120 | 120 | 120 | 120 | 120 | 120 | 120 | 120 | 120 |

*Not an example of the present invention

Figure 4:
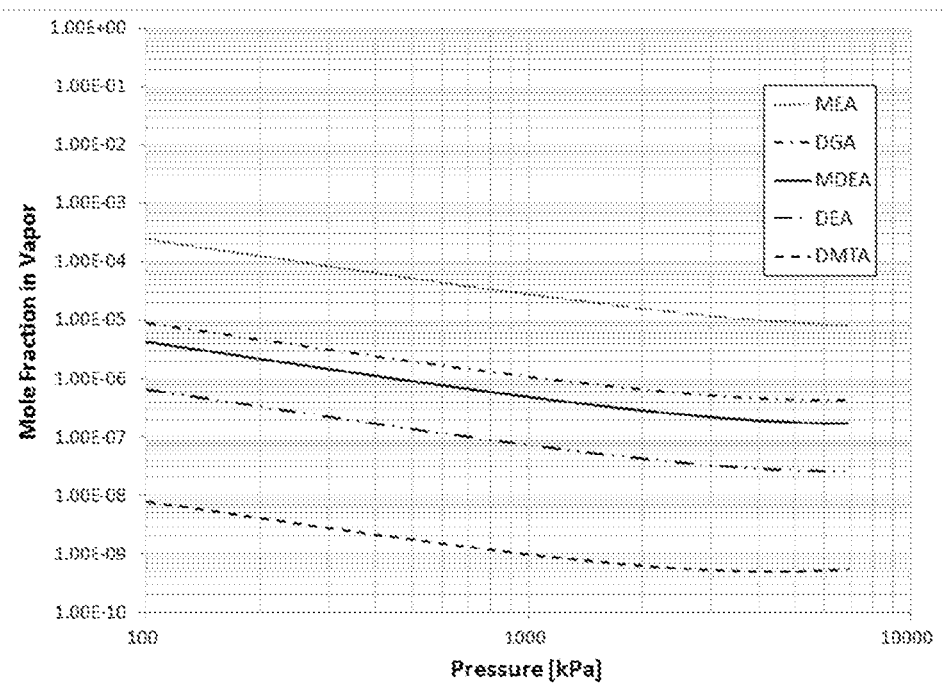
FIG. 4 is a plot of volatility curves for 40 wt % solutions of DMTA, DEA, MDEA, DGA, and MEA at 120° F.

Solvent losses for MEA, DGA, MDEA, DEA, and DMTA are shown on FIG. 4. It can be seen that for each alkanolamine, the losses decrease with increasing pressure. Further, the results clearly show that for a given pressure, the volatility ranking is: DMTA<DEA<MDEA<DGA<MEA.

Selectivity of $H_2S$ Over $CO_2$ Acquired by Headspace Analysis.

Solutions containing 50 wt % of alkanolamine and 50 wt % of water are loaded with about 0.5 mol/mol of an acid gas mixture containing various ratios of $H_2S$ and $CO_2$ and then studied by headspace analysis at 40° C. and 20 psig. Results for MDEA are shown in Table 3 and results for DMTA are shown in Table 4.

TABLE 3

MDEA/Water (50/50)

| Example | H₂S (mol/mol) in the liquid | CO₂ (mol/mol) in the liquid | H₂S in Headspace, % | CO₂ in Headspace, % |
|---|---|---|---|---|
| 16* | 0.11 | 0.43 | 4.15 | 16.22 |
| 17* | 0.22 | 0.33 | 8.93 | 13.79 |
| 18* | 0.33 | 0.22 | 14.62 | 10.34 |
| 19* | 0.43 | 0.11 | 17.72 | 5.88 |

*Not an example of the present invention

TABLE 4

DMTA/Water (50/50)

| Example | H₂S (mol/mol) in the liquid | CO₂ (mol/mol) in the liquid | H₂S in Headspace, % | CO₂ in Headspace, % |
|---|---|---|---|---|
| 20 | 0.10 | 0.42 | 4.37 | 33.68 |
| 21 | 0.21 | 0.31 | 8.52 | 21.17 |
| 22 | 0.30 | 0.20 | 11.26 | 12.60 |
| 23 | 0.40 | 0.10 | 11.77 | 5.16 |

One characteristic of ultimate importance for the formulation is the selectivity for $H_2S$ over $CO_2$. This selectivity can be defined by the mole fraction below:

$$\frac{(\text{moles of } H_2S/\text{moles of } CO_2) \text{ in liquid phase}}{(\text{moles of } H_2S/\text{moles of } CO_2) \text{ in gaseous phase}}$$

Selectivity for $H_2S$ Over $CO_2$ for MDEA and DMTA is Summarized in Table 5.

TABLE 5

| Example | | ratio in the liquid | ratio in the gas | selectivity |
|---|---|---|---|---|
| 16* | MDEA | 0.27 | 0.26 | 1.04 |
| 17* | | 0.66 | 0.65 | 1.02 |
| 18* | | 1.49 | 1.41 | 1.06 |
| 19* | | 3.84 | 3.02 | 1.27 |
| 20 | DMTA | 0.25 | 0.13 | 1.93 |
| 21 | | 0.67 | 0.40 | 1.65 |
| 22 | | 1.50 | 0.89 | 1.68 |
| 23 | | 4.00 | 2.28 | 1.75 |

*Not an example of the present invention

What is claimed is:

1. A process for removing acid gases from a gaseous mixture, the process comprising the step of contacting the gaseous mixture with an aqueous alkanolamine solution, wherein the alkanolamine solution consists essentially of:
   (i) 2-dimethylamino-2-hydroxymethyl-1,3-propanediol,
   (ii) an acid having a pKa of 8 or less or an acid-forming material capable of forming in aqueous medium an acid having a pKa of 8 or less,
   (iii) an additional amino compound, and
   (iv) water.

2. The process of claim 1 wherein the temperature of the aqueous alkanolamine solution is equal to or greater than 40° F.

3. The process of claim 1 or 2 further comprising the step of partially removing acid gases from the aqueous alkanolamine solution to form an acid gas lean aqueous alkanolamine solution which may be used in said contacting step.

4. The process of claim 3 wherein the step of partially removing acid gases is achieved by steam stripping.

5. The process of claim 1 wherein based on the total weight of the aqueous alkanolamine solution:
   (i) the 2-dimethylamino-2-hydroxymethyl-1, 3-propanediol is present in an amount of from 0.1 to 75 weight percent,
   (ii) the acid or acid-forming material is present in an amount of from 0.1 to 25 weight percent, and
   (iii) the additional amino compound is present in an amount of from 0.1 to 75 weight percent.

6. The process of claim 1 wherein the acid or acid-forming material (ii) is present in an amount of 0.1 to 25 weight percent and is phosphoric acid, sulfuric acid, boric acid, formic acid, or hydrochloric acid.

7. The process of claim 1 wherein the additional amino compound (iii) is present in an amount of 0.1 to 75 weight percent and is monoethanolamine (MEA); tris(2-hydroxyethyl)amine (TEA); tris(2-hydroxypropyl)amine (triisopropanol); tributanolamine; bis(2-hydroxyethyl)methylamine (MDEA); 2-diethylaminoethanol (DEEA); 2-dimethylaminoethanol (DMEA); 3-dimethylamino-1-propanol; 3-diethylamino-1-propanol; 2-diisopropylaminoethanol (DIEA); N,N-bis(2-hydroxypropyl)methylamine (MDIPA); N,N'-bis(2-hydroxyethyl)piperazine (DiHEP); diethanolamine (DEA); 2-(tert-butylamino)ethanol; 2-(tert-butylaminoethoxy)ethanol; 2-amino-2-methylpropanol (AMP); 2-(2-amino-ethoxy)ethanol; or a 1-hydroxyethyl-4-pyridinylpiperazine compound.

8. A process for removing acid gases from a gaseous mixture, the process comprising the step of contacting the gaseous mixture with an aqueous alkanolamine solution, wherein the aqueous alkanolamine solution consists essentially of:
   (i) 2-dimethylamino-2-hydroxymethyl-1,3-propanediol,
   (ii) an acid having a pKa of 8 or less or an acid-forming material capable of forming in aqueous medium an acid having a pKa of 8 or less, and
   (iii) water.

9. The process of claim 8 wherein the acid or acid-forming material (ii) is present in an amount of 0.1 to 25 weight percent and is phosphoric acid, sulfuric acid, boric acid, formic acid, or hydrochloric acid.

10. The process of claim 8 further comprising the step of partially removing acid gases from the aqueous alkanolamine solution to form an acid gas lean aqueous alkanolamine solution which may be used in said contacting step.

11. The process of claim 10 wherein the step of partially removing acid gases is achieved by steam stripping.

12. The process of claim 8 wherein hydrogen sulfide is selectively removed from a gaseous mixture comprising hydrogen sulfide wherein the aqueous alkanolamine solution does not comprise any additional amino compounds.

13. The process of claim 12 wherein the acid or acid-forming material (ii) is present in an amount of 0.1 to 25 weight percent and is phosphoric acid, sulfuric acid, boric acid, formic acid, or hydrochloric acid.

* * * * *